(12) United States Patent
Lin et al.

(10) Patent No.: US 11,467,419 B2
(45) Date of Patent: Oct. 11, 2022

(54) PROJECTION MODULE, STRUCTURED LIGHT THREE-DIMENSIONAL IMAGING DEVICE AND ELECTRONIC APPARATUS

(71) Applicant: NANCHANG O-FILM BIO-IDENTIFICATION TECHNOLOGY CO., LTD., Nanchang (CN)

(72) Inventors: Joseph Lin, Nanchang (CN); Horatio Lee, Nanchang (CN); Martin Chen, Nanchang (CN); George Chou, Nanchang (CN)

(73) Assignee: NANCHANG O-FILM BIO-IDENTIFICATION TECHNOLOGY CO., LTD., Nanchang (CN)

( * ) Notice: Subject to any disclaimer, the term of this patent is extended or adjusted under 35 U.S.C. 154(b) by 84 days.

(21) Appl. No.: 17/043,954

(22) PCT Filed: Jun. 12, 2019

(86) PCT No.: PCT/CN2019/090828
§ 371 (c)(1),
(2) Date: Sep. 30, 2020

(87) PCT Pub. No.: WO2020/052300
PCT Pub. Date: Mar. 19, 2020

(65) Prior Publication Data
US 2021/0124181 A1    Apr. 29, 2021

(30) Foreign Application Priority Data

Sep. 14, 2018  (CN) .......................... 201811076642.4
Sep. 14, 2018  (CN) .......................... 201821510410.0

(51) Int. Cl.
*G01B 11/25* (2006.01)
*G02B 27/42* (2006.01)
(Continued)

(52) U.S. Cl.
CPC .......... *G02B 27/425* (2013.01); *G01B 11/254* (2013.01); *G02B 5/1861* (2013.01); *G02B 27/30* (2013.01)

(58) Field of Classification Search
CPC ... G01B 11/25; G01B 11/254; G01B 11/2513; G02B 27/30; G02B 27/425;
(Continued)

(56) References Cited

U.S. PATENT DOCUMENTS 6,965,483 B2 * 11/2005 Lindblom .............. G02B 27/30
                                                         385/24
7,898,660 B2 *  3/2011 Warren .................... G01J 3/18
                                                         356/328

(Continued)

OTHER PUBLICATIONS

WIPO, ISR for PCT/CN2019/090828, dated Sep. 11, 2019.

*Primary Examiner* — Isiaka O Akanbi
(74) *Attorney, Agent, or Firm* — Grace Lee Huang

(57) ABSTRACT

Disclosed are a projection module, a structured light three-dimensional imaging device, and an electronic apparatus. The projection module includes a laser emitter and a reflective grating. The laser emitter includes a light emitting surface from which laser light is emitted. The reflective grating includes a reflecting surface arranged obliquely relative to the light emitting surface and opposite to the light emitting surface. The reflective face is provided with a grating microstructure thereon. The projection module can adjust a reflection angle of the laser light when expanding beams to generate a laser pattern.

17 Claims, 5 Drawing Sheets

(51) Int. Cl.
 *G02B 5/18* (2006.01)
 *G02B 27/30* (2006.01)

(58) Field of Classification Search
 CPC .............. G02B 5/1861; G02B 27/0961; G02B 27/0977; F21V 5/007; F21V 5/045; F21V 5/08; G03B 15/06; H01S 5/423
 USPC .................. 356/445–448, 432, 300–334, 610
 See application file for complete search history.

(56) References Cited

U.S. PATENT DOCUMENTS

| | | | |
|---|---|---|---|
| 8,251,517 B2* | 8/2012 | Gibson | H04N 9/3129 353/50 |
| 2002/0105725 A1* | 8/2002 | Sweatt | G02B 27/46 359/566 |
| 2003/0011769 A1* | 1/2003 | Rakuljic | G02B 6/2931 356/328 |
| 2007/0285666 A1* | 12/2007 | Utsunomiya | G01N 21/554 356/432 |
| 2017/0094257 A1* | 3/2017 | Zhang | H02J 7/00 |
| 2018/0173082 A1* | 6/2018 | Okumura | G09G 3/20 |
| 2019/0360799 A1* | 11/2019 | Brahm | G01B 11/2518 |

\* cited by examiner

PROJECTION MODULE, STRUCTURED LIGHT THREE-DIMENSIONAL IMAGING DEVICE AND ELECTRONIC APPARATUS

CROSS-REFERENCES TO RELATED DISCLOSURES

The present application is a national phase entry under 35 USC § 371 of International Application PCT/CN2019/090828, filed on Jun. 12, 2019, which claims priority to Chinese Patent Application No. 201811076642.4 and Chinese Patent Application No. 201821510410.0, each filed on Sep. 14, 2018, the entire disclosures of which are incorporated herein by reference.

FIELD

The present disclosure relates to the field of photoelectric technology, and more particularly, to a projection module, a structured light three-dimensional imaging device, and an electronic apparatus.

BACKGROUND

In an existing projection module using an edge-emitting laser as a light source, the edge-emitting laser is generally placed horizontally with a light emitting direction being perpendicular to a light outputting direction, and then a laser direction of the edge-emitting laser is changed by one prism to reduce a height of the projection module. However, the arrangement of the extra prism in the projection module not only occupies mounting space in the projection module, but also increases the cost of the projection module.

SUMMARY

Embodiments of the present disclosure provide a projection module, a structured light three-dimensional imaging device, and an electronic apparatus.

The projection module according to the embodiments of the present disclosure includes a laser emitter and a reflective grating. The laser emitter includes a light emitting surface from which laser light is emitted. The reflective grating includes a reflecting surface. The reflecting surface is arranged obliquely relative to the light emitting surface and is opposite the light emitting surface. The reflecting surface is provided with a grating microstructure thereon, the grating microstructure is configured to expand the laser light to form a laser pattern, and the reflecting surface is configured to adjust an exit angle of the laser pattern.

In the projection module according to the embodiments of the present disclosure, since the grating microstructure is provided on the reflecting surface of the reflective grating and the reflecting surface is obliquely arranged relative to the light emitting surface, the reflective grating may not only expand the laser light to generate the laser pattern, but also adjust a reflection angle of the laser light without separately arranging a prism to adjust the reflection angle of the laser light, which not only omits the mounting space for the prism, but also saves the cost of the prism.

In some embodiments, the laser emitter includes an edge-emitting laser or a vertical-cavity surface-emitting laser.

The edge-emitting laser is a single-point light emitting structure. When the edge-emitting laser is used as the laser emitter, there is no need to design an array structure, such that the production is easy and the laser emitter of the laser projection module has a low cost. Further, compared with the vertical-cavity surface-emitting laser, a temperature drift of the edge-emitting laser is relatively small. If the vertical-cavity surface-emitting laser is adopted as the laser emitter, an irrelevance degree of the laser pattern is higher, which is conducive to obtaining a high-precision depth image.

In some embodiments, the projection module further includes a substrate, the laser emitter is arranged on the substrate, and the light emitting surface is perpendicular to the substrate.

The light emitting surface is perpendicular to the substrate, and the reflecting surface is opposite to the light emitting surface. An exit direction of the laser light is substantially parallel to the substrate, that is, the laser emitter is in a lying-flat arrangement (being laid down relative to a vertical arrangement), such that the projection module has a periscope structure, thus shortening the height of the projection module.

In some embodiments, the projection module further includes a fixing member arranged on the substrate, the reflective grating includes a mounting surface facing away from the reflecting surface, and the fixing member is connected to the mounting surface of the reflective grating to fix the reflective grating.

The fixing member in the projection module is arranged on the substrate and connected to the mounting surface of the reflective grating, so as to firmly fix the reflective grating on the substrate and keep the reflecting surface in a position opposite the light emitting surface.

In some embodiments, the reflective grating is a triangular prism and includes a bearing surface, the reflecting surface, and a connecting surface connecting the bearing surface and the reflecting surface, and the bearing surface is arranged on the substrate.

The reflective grating itself is constructed as a triangular prism, and the reflecting surface is opposite to the light emitting surface. The triangular prism is arranged on the substrate through the bearing surface, and there is no need to arrange an extra fixing member for fixation and support, so the integration degree is much higher.

In some embodiments, the grating microstructure is a nanoscale grating microstructure and is evenly distributed on the reflecting surface.

The density of the nanoscale grating microstructure is higher, and compared with the ordinary micron-scale grating microstructure, the laser beam can be expanded into more laser beams to form a more accurate laser pattern.

In some embodiments, a region of the reflecting surface provided with the grating microstructure covers a range of a light-emitting field of view of the laser emitter.

The grating microstructure covers the range of the light-emitting field of view of the laser emitter, that is, all the laser light rays can be irradiated on the grating microstructure to ensure that all the laser light rays can be modulated by the grating microstructure instead of being directly reflected out, thus ensuring the accuracy of the output laser pattern.

In some embodiments, a collimation lens is arranged between the laser emitter and the reflective grating and located on an incident path of the laser light, and the collimation lens is configured to collimate light rays emitted from the laser emitter into a collimated light beam and transmit the collimated light beam to the reflective grating; and/or an adjustment lens is arranged on a light output path of the laser pattern and configured to adjust optical performance of the output light beam.

When the collimation lens is arranged between the laser emitter and the reflective grating and located on the incident path of the laser light, the collimation lens can collimate the laser incident onto the reflective grating, such that all the laser light rays emitted from the laser emitter can enter the reflective grating, so as to improve the utilization rate of the laser light rays. When the adjustment lens is arranged on a light output path of the laser pattern, the adjustment lens can adjust the optical performance of the output laser pattern, such as adjustment for contrast, distortion and a field angle, so as to adjust the projection quality and effect of the laser pattern. When the collimation lens is arranged between the laser emitter and the reflective grating and located on the incident path of the laser light, and the adjustment lens is arranged on the light output path of the laser pattern, the collimation lens arranged between the laser emitter and the reflective grating enables all the laser light rays emitted from the laser emitter to enter the reflective grating, so as to improve the utilization rate of the laser light rays, and the adjustment lens arranged on the light output path of the laser pattern can adjust the projected laser pattern, so as to adjust the projection quality and effect of the laser pattern.

The structured light three-dimensional imaging device according to embodiments of the present disclosure includes a camera and the projection module according to any of the above embodiments. The projection module is configured to emit a laser pattern towards a target object. The projection module includes a laser emitter and a reflective grating. The laser emitter includes a light emitting surface from which laser light is emitted. The reflective grating includes a reflecting surface that is obliquely arranged relative to the light emitting surface and is provided with a grating microstructure thereon. The grating microstructure is configured to expand the laser light to form the laser pattern, and the reflecting surface is configured to adjust an exit angle of the laser pattern. The camera is configured to receive the laser pattern reflected by the target object.

In the structured light three-dimensional imaging device according to the embodiments of the present disclosure, since the grating microstructure is provided on the reflecting surface of the reflective grating and the reflecting surface is obliquely arranged relative to the light emitting surface, the reflective grating may not only expand the laser light to generate the laser pattern, but also adjust a reflection angle of the laser light without separately arranging a prism to adjust the reflection angle of the laser light, which not only omits the mounting space for the prism, but also saves the cost of the prism.

The electronic apparatus according to embodiments of the present disclosure includes a housing and the structured light three-dimensional imaging device according to any one of the above embodiments. The structured light three-dimensional imaging device includes a projection module and a camera. The projection module is configured to emit a laser pattern towards a target object. The projection module includes: a laser emitter and a reflective grating. The laser emitter includes a light emitting surface from which laser light is emitted. The reflective grating includes a reflecting surface that is obliquely arranged relative to the light emitting surface and is provided with a grating microstructure thereon. The grating microstructure is configured to expand the laser light to form a laser pattern. The reflecting surface is configured to adjust an exit angle of the laser pattern. The camera is configured to receive the laser pattern reflected by the target object.

In the electronic apparatus according to the embodiments of the present disclosure, since the grating microstructure is provided on the reflecting surface of the reflective grating and the reflecting surface is obliquely arranged relative to the light emitting surface, the reflective grating may not only expand the laser light to generate the laser pattern, but also adjust a reflection angle of the laser light without separately arranging a prism to adjust the reflection angle of the laser light, which not only omits the mounting space for the prism, but also saves the cost of the prism. Moreover, the housing has a protective effect on the structured light three-dimensional imaging device.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings.

DETAILED DESCRIPTION

Embodiments of the present disclosure are further described with reference to the accompanying drawings. Same or similar reference signs represent the same or similar elements or elements that have the same or similar functions throughout the present disclosure.

Moreover, the embodiments described below with reference to the accompanying drawings are exemplary and merely used to explain embodiments of the present disclosure and cannot be construed as limitation to the present disclosure.

In the description of the present disclosure, it should be noted that, unless otherwise expressly specified and limited, a first feature "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Figure 1:
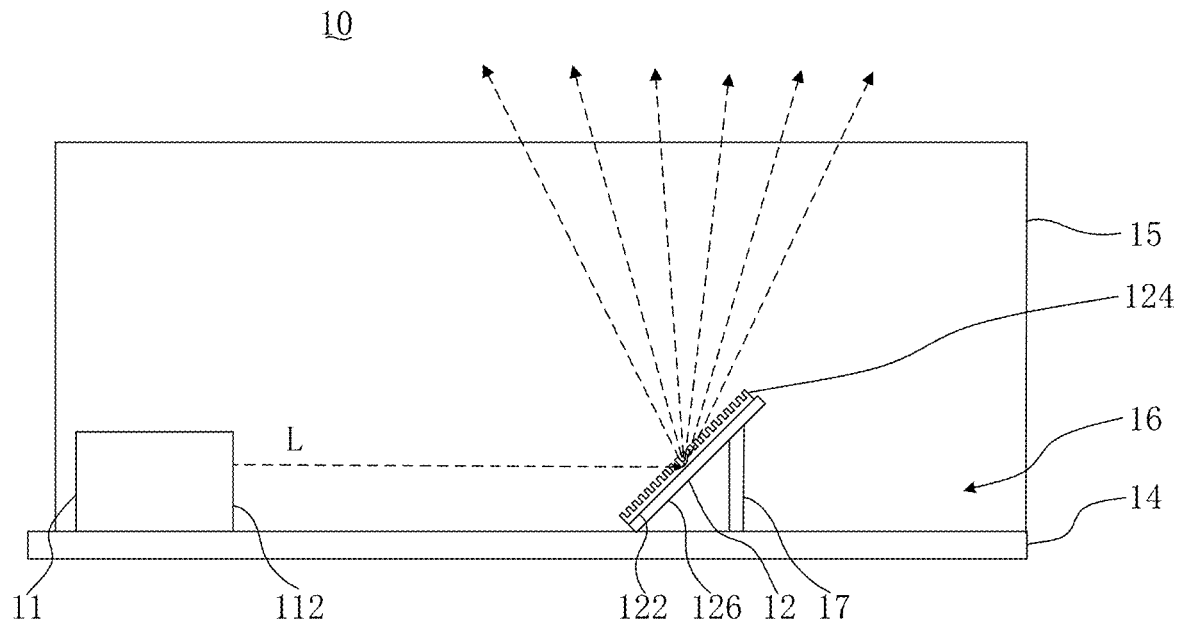
FIG. 1 is a schematic view of a projection module according to some embodiments of the present disclosure.

Referring to FIG. 1, a projection module 10 includes a laser emitter 11 and a reflective grating 12. The laser emitter 11 includes a light emitting surface 112 from which laser light L is emitted. The reflective grating 12 includes a reflecting surface 122 which is obliquely arranged relative to the light emitting surface 112, that is, the reflecting surface 122 are arranged opposite to the light emitting surface 112. The reflecting surface 122 is provided with a grating microstructure 124 thereon, and the grating microstructure 124 can expand the laser light L emitted from the light emitting surface 112 to form a laser pattern, and adjust an exit angle of the laser pattern by the reflecting surface 122.

Specifically, the laser emitter 11 emits the laser light L from the light emitting surface 112 which is opposite to the reflecting surface 122. That is, the laser emitter 11 emits the laser light L to the reflecting surface 122 which is obliquely arranged relative to the light emitting surface 112 and provided with the grating microstructure 124. The laser light L is expanded to form the laser pattern when passing through the grating microstructure 124, and the exit angle of the laser light will be changed after the laser light is reflected by the reflecting surface 122. The reflecting surface 122 can reflect the laser light L by being provided with a reflective coating, such that the laser pattern is emitted from the projection module 10 at a predetermined angle.

In the projection module 10 according to embodiments of the present disclosure, since the grating microstructure 124 is provided on the reflecting surface 122 of the reflective grating 12 and the reflecting surface 122 is obliquely arranged relative to the light emitting surface 112, the reflective grating 12 may not only expand the laser light L to generate the laser pattern, but also adjust a reflection angle of the laser light L without separately arranging a prism to adjust the reflection angle of the laser light L, which not only omits the mounting space for the prism, but also saves the cost of the prism.

Referring to FIG. 1, the projection module 10 includes a substrate 14, a lens barrel 15, a laser emitter 11, and a reflective grating 12.

The substrate 14 may be at least one of a flexible circuit board, a rigid circuit board, or a flex-rigid circuit board.

The lens barrel 15 is arranged on the substrate 14 and forms a receiving space 16 together with the substrate 14. The connection ways of the lens barrel 15 and the substrate 14 include screwing, gluing, clamping, welding, etc. Both the laser emitter 11 and the reflective grating 12 are received in the receiving space 16. The lens barrel 15 has a protective effect on the laser emitter 11 and the reflective grating 12.

The laser emitter 11 is arranged on the substrate 14 and includes the light emitting surface 112 from which the laser light is emitted. The light emitting surface 112 is perpendicular to the substrate 14, and the reflecting surface 122 is opposite to the light emitting surface 112. An exit direction of the laser light is substantially parallel to the substrate 14, that is, the laser emitter 11 is in a lying-flat arrangement (being laid down relative to a vertical arrangement), such that the projection module 10 has a periscope structure, thus shortening the height of the projection module 10. The laser emitter 11 may be an edge-emitting laser (such as a distributed feedback laser (DFB)) or a vertical-cavity surface-emitting laser (VCSEL). The edge-emitting laser is a single-point light emitting structure. When the edge-emitting laser is used as the laser emitter 11, there is no need to design an array structure, such that the production is easy and the laser emitter 11 of the laser projection module has a low cost. Further, compared with the vertical-cavity surface-emitting laser, a temperature drift of the edge-emitting laser is relatively small. If the vertical-cavity surface-emitting laser is adopted as the laser emitter 11, an irrelevance degree of the laser pattern is higher, which is conducive to obtaining a high-precision depth image.

The reflective grating 12 is arranged on the substrate 14 and includes the reflecting surface 122 and a mounting surface 126, and the reflecting surface 122 faces away from the mounting surface 126. The reflecting surface 122 is opposite to the light emitting surface 112 and is obliquely arranged relative to the light emitting surface 112. The reflection angle of the laser light may be controlled by controlling an inclination angle of the reflecting surface 122 relative to the light emitting surface 112. An incident angle of the laser light emitted from the light emitting surface 112 into the reflective grating 12 is greater than 0 degree and less than 90 degrees, that is, an incident direction of the laser light cannot be parallel or vertical to the reflecting surface 122, so as to prevent the laser light from failing to be reflected or from being reflected back along an incident light path. For example, the incident angle of the laser light emitted from the light emitting surface 112 may be 15 degrees, 30 degrees, 45 degrees, 65 degrees, etc., which can be determined according to the requirements for the exit angle of the laser pattern.

The reflecting surface 122 is provided with the grating microstructure 124. The reflective grating 12 according to the embodiment of the present disclosure realizes a diffractive effect of a diffractive optical element (DOE) by arranging the grating microstructure 124 on the reflecting surface 122. The diffractive optical element is a kind of optical elements with coaxial reproduction and extremely high diffraction efficiency, and formed by etching a stepped or continuous relief structure (i.e., the grating microstructure 124) on the substrate (or a traditional optical device surface) using the computer-aided design and through the semiconductor chip manufacturing technology, based on the principle of light diffraction. The laser light generates optical path differences when passing through the grating microstructure 124, which meets the Bragg diffraction condition. A divergence angle of the laser light and a morphology of a formed light spot are controlled by different designs, so as to realize a function of forming specific laser patterns. The reflecting surface 122 of the reflective grating 12 according to the embodiment of the present disclosure is provided with the grating microstructure 124 thereon, and the grating microstructure 124 includes a plurality of steps with a certain depth. Compared with a micron-scale grating microstructure of a common diffractive optical structure, the grating microstructure 124 of the reflective grating 12 of the present disclosure is a nanoscale grating microstructure 124 which is evenly distributed on the reflecting surface 122, so as to control the divergence angle of the laser light and the morphology of the formed light spot more precisely, thereby expanding a laser beam to form a specific laser pattern. Moreover, the density of the nanoscale grating microstructure 124 is higher, and compared with the ordinary micron-scale grating microstructure 124, the laser beam can be expanded into more laser beams to form a more accurate laser pattern.

A region of the reflecting surface 122 on which the grating microstructure 124 is arranged covers the range of a light-emitting field of view of the laser emitter. That is, all the laser light rays can be irradiated on the grating microstructure 124 to ensure that all the laser light rays can be modulated by the grating microstructure 124 instead of being directly reflected out, thus ensuring the accuracy of the output laser pattern.

The reflective grating 12 may be of any suitable shape, such as a rectangle, a cylinder, etc., which is not limited herein. In some embodiments, the projection module 10 also includes a fixing member 17. An end of the reflective grating 12 is connected with the substrate 14. The fixing member 17 is arranged on the substrate 14 and connected to the mounting surface 126 of the reflective grating 12. That is, the fixing member 17 is configured to support the reflective grating 12 and keep the reflecting surface 122 in a position opposite to the light emitting surface 112. The reflective grating 12, the substrate 14, and the fixing member 17 form a triangle-like structure. The connection between the end of the reflective grating 12 and the substrate 12, the connection between the fixing member 17 and the substrate 14, and the connection between the fixing member 17 and the reflective grating 12 may be a connecting manner such as clamping, gluing, screwing, etc., such that the fixing member 17, the reflective grating 12, and the substrate 14 can be firmly connected together.

Figure 2:
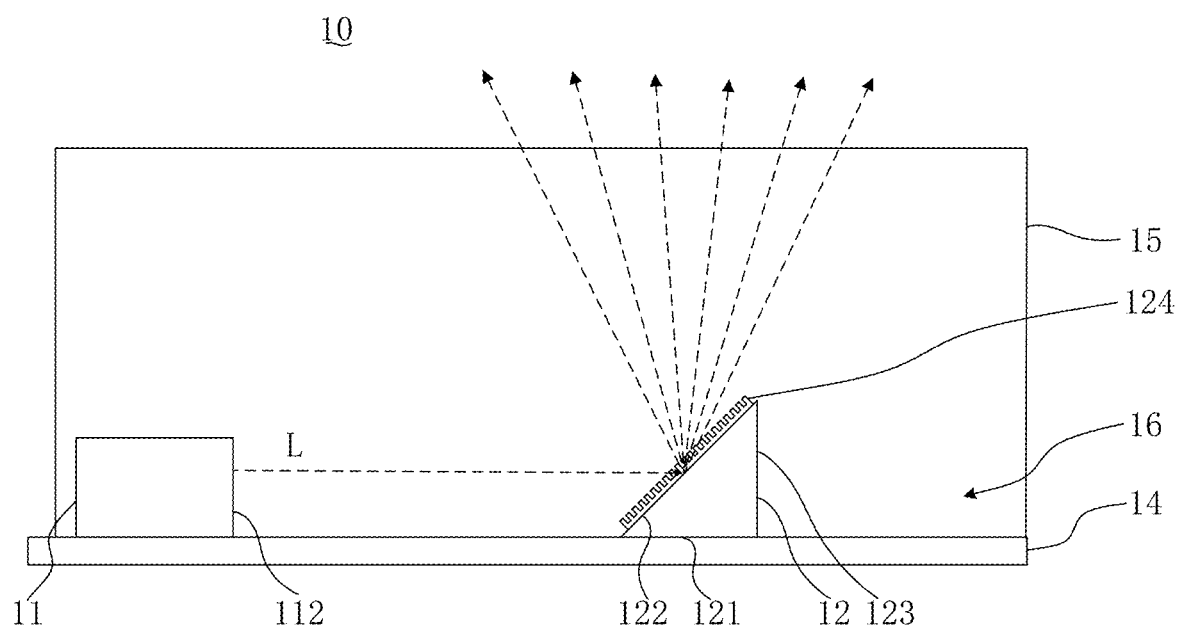
FIG. 2 is a schematic view of a projection module according to some embodiments of the present disclosure.

Referring to FIG. 2, in other embodiments, the reflective grating 12 is a triangular prism and includes a bearing surface 121, a reflecting surface 122, and a connecting surface 123 which connects the bearing surface 121 and the reflecting surface 122. The bearing surface 121 is arranged on the substrate 14, and the bearing surface 121 may be connected with the substrate 14 by clamping, screwing, gluing, etc., so as to fix the reflective grating 12 on the substrate 14. By adjusting an included angle between the reflecting surface 122 and the bearing surface 121, the projection module 10 can keep the reflecting surface 122 opposite to the light emitting surface 112 and adjust the reflection angle of the laser light. The reflective grating 12 is fixed on the substrate 14 through the bearing surface 121, and compared with the situation where the fixation is realized by the fixing member 17 and one end of the reflective grating 12 is connected to the substrate 14 (as illustrated in FIG. 1), a contact area between the reflective grating 12 and the substrate 14 is larger, and the connection is more stable. Moreover, there is no need to arrange an extra fixing member 17 for support and fixation, and the integration degree is relatively high.

Figure 3:
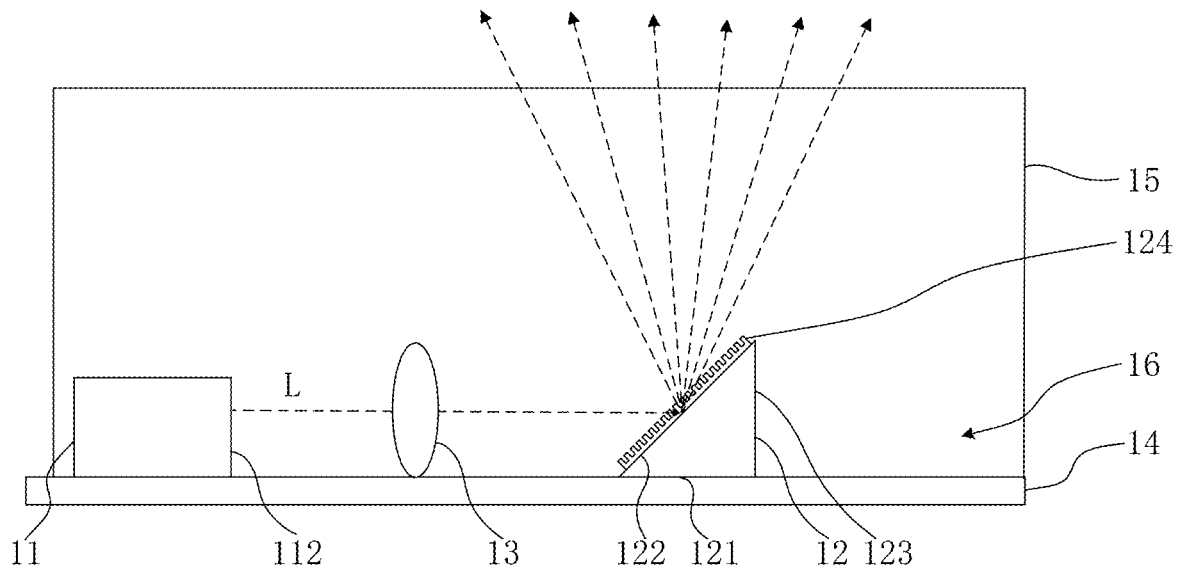
FIG. 3 is a schematic view of a projection module according to another embodiment of the present disclosure.

Referring to FIG. 3, in some embodiments, the projection module 10 may also include a collimation lens 13 and/or an adjustment lens 13' received in the receiving space 16. The collimation lens 13 and the adjustment lens 13' are lenses, each of which may be a single lens, such as a convex lens or a concave lens. Alternatively, both of the collimation lens 13 and the adjustment lens 13' may include a plurality of lenses, and each of the plurality of lenses may be a convex lens or a concave lens, or a part of the lenses are convex lenses and another part of the lenses are concave lenses. The positions of the collimation lens 13 and the adjustment lens 13' can be set in many ways, as described below.

First situation: referring to FIG. 3, the collimation lens 13 is arranged between the laser emitter 11 and the reflective grating 12 and arranged on an incident path of the laser light. That is, the collimation lens 13 can collimate the laser light emitted from the light emitting surface 112 to form a collimated light beam and transmit it substantially parallel to the substrate 11 and towards the reflecting surface 122, so as to ensure that all the laser light rays are transmitted into the reflective grating 12, and improve the utilization rate of the laser light rays.

Figure 4:
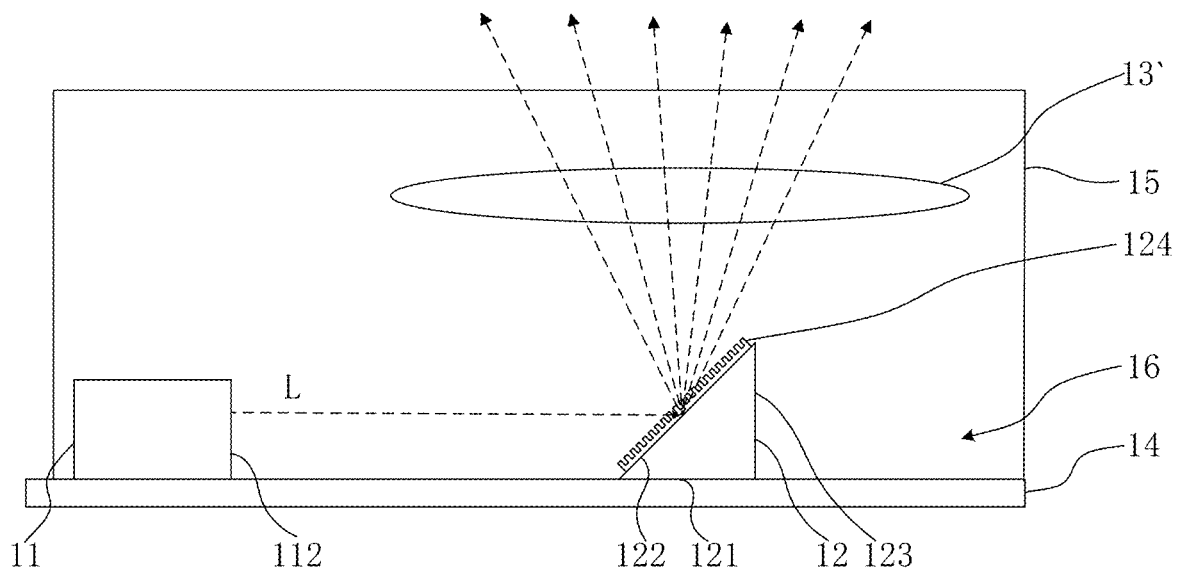
FIG. 4 is a schematic view of a projection module according to still another embodiment of the present disclosure.

Second situation: referring to FIG. 4, the adjustment lens 13' is arranged on a light output path of the laser pattern, and can adjust the optical performance of the output laser pattern, such as adjustment for possible contrast, distortion, and a field angle, so as to adjust the projection quality and effect of the laser pattern. The adjustment lens 13' may be provided with different adjustment functions according to requirements, which is not limited in the embodiments of the present disclosure.

Figure 5:
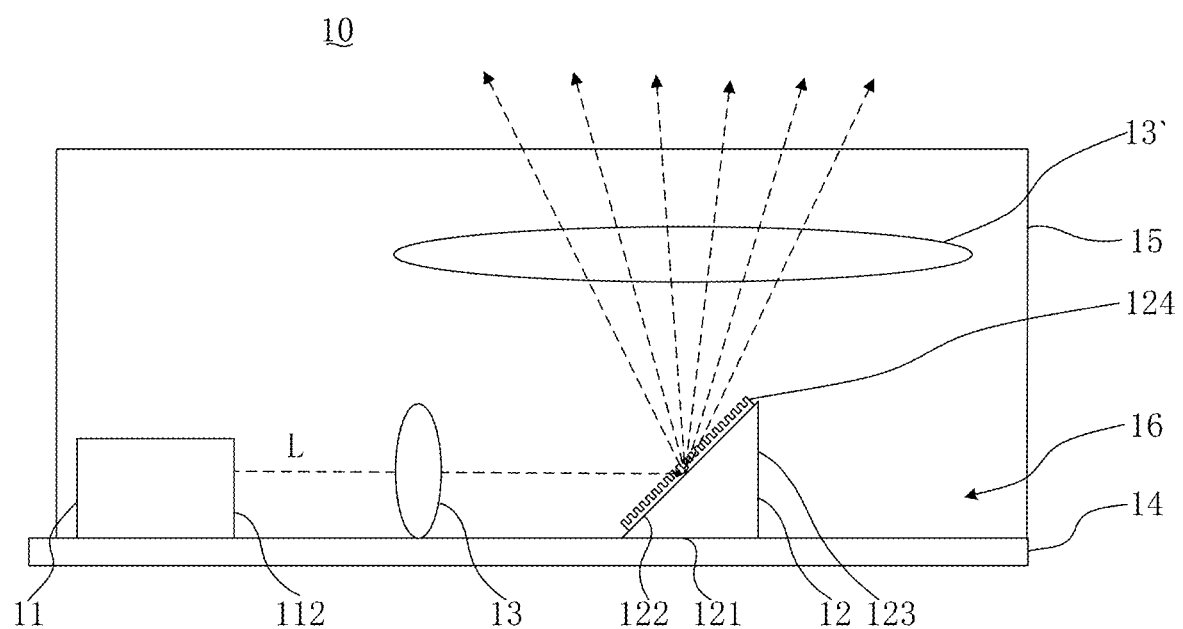
FIG. 5 is a schematic view of a projection module according to yet another embodiment of the present disclosure.

The third situation: referring to FIG. 5, the projection module 10 includes a collimation lens 13 and an adjustment lens 13'. The collimation lens 13 is arranged between the laser emitter 11 and the reflective grating 12 and located on the incident path of the laser light. The collimation lens 13 can collimate the laser light emitted from the laser emitter 11 such that all the laser light rays emitted from the laser emitter 11 can enter the reflective grating 12, so as to improve the utilization rate of the laser light rays. The adjustment lens 13' is arranged on the light output path of the laser pattern and can adjust the optical performance of the laser pattern, so as to adjust the projection quality and effect of the laser pattern.

In the projection module 10 according to the embodiment of the present disclosure, by arranging the grating microstructure 124 on the reflecting surface 122 of the reflective grating 12 and arranging the reflecting surface 122 obliquely relative to the light emitting surface 112, the grating microstructure 124 may expand the laser to generate the laser pattern. The reflecting surface 122 is provided with a reflective coating to adjust the reflection angle of the laser light without need to separately arrange a prism to adjust the reflection angle of the laser light, which not only omits the mounting space for the prism, but also saves the cost of the prism.

Figure 6:
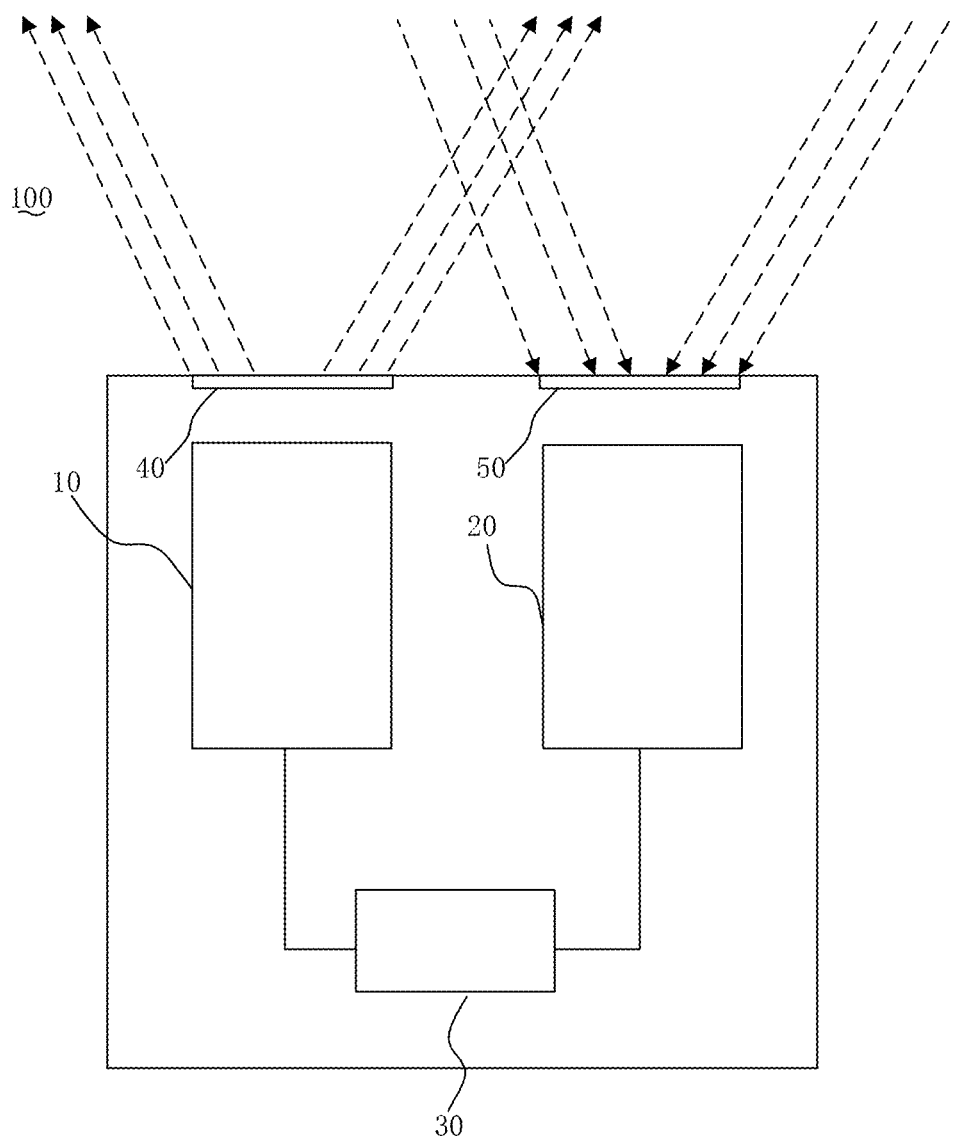
FIG. 6 is a schematic view of a structured light three-dimensional imaging device according to embodiments of the present disclosure.

Referring to FIG. 6, a structured light three-dimensional imaging device 100 according to embodiments of the present disclosure includes the projection module 10, a camera 20 and a processor 30. The projection module 10 is configured to output a laser pattern towards a target object. The camera 20 is configured to receive the laser pattern modulated by the target object. The processor 30 is configured for imaging (a depth image) according to the laser pattern received by the camera 20.

Referring to FIGS. 5 and 6, the structured light three-dimensional imaging device 100 is formed with a projection window 40 corresponding to the projection module 10, and a collection window 50 corresponding to the camera 20. The projection module 10 is configured to project the laser pattern to a target space through the projection window 40, and the camera 20 is configured to receive the laser pattern reflected by the target object for imaging. When the projection module 10 illuminates, the laser emitter 11 emits the laser light, and the laser light is reflected by the reflective grating 12 to form the laser pattern which is projected out from the projection window 40. For example, the projection module 10 projects the laser pattern towards the target object, and the laser pattern is a speckle pattern. The camera 20 collects the laser pattern reflected by the target object through the collection window 50. The processor 30 is coupled to both the camera 20 and the projection module 10 and is configured to process the above laser pattern to obtain the depth image. Specifically, the processor 30 compares the laser pattern with a reference pattern, and generates the depth image according to differences between the laser pattern and the reference pattern. In other embodiments, the laser pattern is a coded structured light image with a specific pattern (i.e., a specific code). The coded structured light image is extracted from the laser pattern and then compared with the reference pattern, thereby obtaining the depth image. After being obtained, the depth image can be applied to fields such as face recognition, three-dimensional modeling and the like.

In the structured light three-dimensional imaging device 100 according to the embodiment of the present disclosure, since the reflecting surface 122 of the reflective grating 12 is provided with the grating microstructure 124, and the reflecting surface 122 is obliquely arranged relative to the light emitting surface 112, the grating microstructure 124 can expand the laser light to generate the laser pattern. The reflecting surface 122 is provided with the reflective coating to adjust the reflection angle of the laser light without need to arrange an extra prism to adjust the reflection angle of the laser light, which not only omits the mounting space for the prism, but also saves the cost of the prism. Additionally, with the cooperation of the camera 20 and the processor 30, the structured light three-dimensional imaging device 100 can receive and process the laser pattern modulated by the target object to obtain the depth image, which thus can be applied to fields such as face recognition, three-dimensional modeling and the like.

Figure 7:
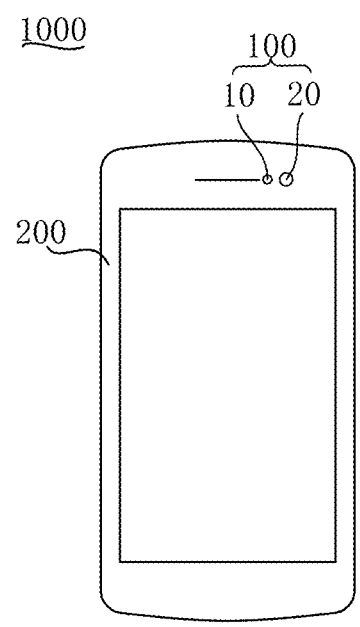
FIG. 7 is a schematic view of an electronic apparatus according to embodiments of the present disclosure.

Referring to FIGS. 5 and 7, an electronic apparatus 1000 according to embodiments of the present disclosure includes a housing 200 and the structured light three-dimensional imaging device 100. The electronic apparatus 1000 may be a mobile phone, a monitoring camera, a tablet computer, a laptop computer, a game machine, a head-mounted display device, an access control system, a teller machine or the like. The embodiments of the present disclosure are illustrated by way of an example that the electronic apparatus 1000 is a mobile phone. It can be understood that the electronic apparatus 1000 may have other specific forms, which is not limited herein. The structured light three-dimensional imaging device 100 is arranged in the housing 200 and exposed out of the housing 200. The housing 200 can provide the structured light three-dimensional imaging device 100 with protection against dust, water, drop, etc., and the housing 200 is provided with a hole corresponding to the structured light three-dimensional imaging device 100 to allow light to exit or enter the housing 200 through the hole.

In the electronic apparatus 1000 according to the embodiment of the present disclosure, since the reflecting surface 122 of the reflective grating 12 is provided with the grating microstructure 124, and the reflecting surface 122 is obliquely arranged relative to the light emitting surface 112, the grating microstructure 124 can expand the laser light to generate the laser pattern. The reflecting surface 122 is provided with the reflective coating to adjust the reflection angle of the laser without need to separately arrange a prism to adjust the reflection angle of the laser light, which not only omits the mounting space for the prism, but also saves the cost of the prism. Additionally, with the cooperation of the camera 20 and the processor 30, the electronic apparatus 1000 can receive and process the laser pattern modulated by the target object to obtain the depth image, which thus can be applied to fields such as face recognition, three-dimensional modeling and the like.

Reference throughout this specification to "certain embodiments," "an embodiment," "some embodiments," "an exemplary embodiment," "an example," "a specific example," or "some examples" means that a particular feature, structure, material, or characteristic described in connection with the embodiment or example is included in at least one embodiment or example of the present application. In this specification, exemplary descriptions of aforesaid terms are not necessarily referring to the same embodiment or example. Furthermore, the particular features, structures, materials, or characteristics may be combined in any suitable manner in one or more embodiments or examples.

In addition, terms such as "first" and "second" are used herein merely for purposes of description and are not intended to indicate or imply relative importance or to imply the number of indicated technical features. Thus, the feature defined with "first" and "second" may include one or more of this feature. In the description of the present disclosure, "a plurality of" means at least two, such as two, three, unless specified otherwise.

Although embodiments of present application have been shown and described above, it should be understood that above embodiments are just explanatory, and cannot be construed to limit the present application, and changes, modifications, alternatives and variations can be made to the above embodiments by those skilled in the related art within the scope of the present disclosure. The scope of this disclosure is limited by the claims and their equivalents.

The invention claimed is:

1. A projection module comprising:
a laser emitter comprising a light emitting surface from which laser light is emitted;
a reflective grating comprising a reflecting surface that is arranged obliquely relative to the light emitting surface and is provided with a grating microstructure thereon, the grating microstructure being configured to expand the laser light to form a laser pattern, and the reflecting surface being configured to adjust an exit angle of the laser pattern; and
a substrate on which the laser emitter and the reflective grating are arranged, an exit direction of the laser light from the laser emitter being parallel to the substrate.

2. The projection module according to claim 1, wherein the laser emitter comprises an edge-emitting laser or a vertical-cavity surface-emitting laser.

3. The projection module according to claim 1, further comprising a fixing member arranged on the substrate, the reflective grating comprising a mounting surface facing away from the reflecting surface, and the fixing member being connected to the mounting surface of the reflective grating to fix the reflective grating.

4. The projection module according to claim 1, wherein the reflective grating is a triangular prism and comprises a bearing surface, the reflecting surface, and a connecting surface connecting the bearing surface and the reflecting surface, and wherein the bearing surface is arranged on the substrate.

5. The projection module according to claim 1, wherein the grating microstructure is a nanoscale grating microstructure and is evenly distributed on the reflecting surface.

6. The projection module according to claim 1, wherein a region of the reflecting surface provided with the grating microstructure covers a range of a light-emitting field of view of the laser emitter.

7. The projection module according to claim 1, wherein a collimation lens is arranged between the laser emitter and the reflective grating and located on an incident path of the laser light, and the collimation lens is configured to collimate light rays emitted from the laser emitter into a collimated light beam and transmit the collimated light beam to the reflective grating; and/or
an adjustment lens is arranged on a light output path of the laser pattern and configured to adjust optical performance of the output laser pattern.

8. A structured light three-dimensional imaging device, comprising:
  a projection module configured to emit a laser pattern towards a target object, and comprising:
    a laser emitter comprising a light emitting surface from which laser light is emitted;
    a reflective grating comprising a reflecting surface that is arranged obliquely relative to the light emitting surface and is provided with a grating microstructure thereon, wherein the grating microstructure is configured to expand the laser light to form the laser pattern, and the reflecting surface is configured to adjust an exit angle of the laser pattern; and
    a substrate on which the laser emitter and the reflective grating are arranged, an exit direction of the laser light from the laser emitter being parallel to the substrate, and
  a camera configured to receive the laser pattern reflected by the target object.

9. The structured light three-dimensional imaging device according to claim 8, wherein the projection module further comprises a fixing member arranged on the substrate, the reflective grating comprises a mounting surface facing away from the reflecting surface, and the fixing member is connected on the mounting surface of the reflective grating to fix the reflective grating.

10. The structured light three-dimensional imaging device according to claim 8, wherein the reflective grating is a triangular prism and comprises a bearing surface, the reflecting surface, and a connecting surface connecting the bearing surface and the reflecting surface, and wherein the bearing surface is arranged on the substrate.

11. The structured light three-dimensional imaging device according to claim 8, wherein the grating microstructure is a nanoscale grating microstructure and is evenly distributed on the reflecting surface.

12. The structured light three-dimensional imaging device according to claim 8, wherein a region of the reflecting surface provided with the grating microstructure covers a range of a light-emitting field of view of the laser emitter.

13. The structured light three-dimensional imaging device according to claim 8, wherein a collimation lens is arranged between the laser emitter and the reflective grating and located on an incident path of the laser light, and the collimation lens is configured to collimate light rays emitted from the laser emitter into a collimated light beam and transmit the collimated light beam to the reflective grating; and/or
  an adjustment lens is arranged on a light output path of the laser pattern and configured to adjust optical performance of the output laser pattern.

14. An electronic apparatus, comprising:
  a housing; and
  a structured light three-dimensional imaging device arranged in the housing, and comprising:
    a projection module configured to emit a laser pattern towards a target object, and comprising: a laser emitter comprising a light emitting surface from which laser light is emitted; a reflective grating comprising a reflecting surface that is arranged obliquely relative to the light emitting surface and is provided with a grating microstructure thereon, wherein the grating microstructure is configured to expand the laser light to form the laser pattern, and the reflecting surface is configured to adjust an exit angle of the laser pattern; and a substrate on which the laser emitter and the reflective grating are arranged, an exit direction of the laser light from the laser emitter being parallel to the substrate, and a camera configured to receive the laser pattern reflected by the target object.

15. The electronic apparatus according to claim 14, wherein the projection module further comprises a fixing member arranged on the substrate, the reflective grating comprises a mounting surface facing away from the reflecting surface, and the fixing member is connected on the mounting surface of the reflective grating to fix the reflective grating.

16. The electronic apparatus according to claim 14, wherein the reflective grating is a triangular prism and comprises a bearing surface, the reflecting surface, and a connecting surface connecting the bearing surface and the reflecting surface, and wherein the bearing surface is arranged on the substrate.

17. The electronic apparatus according to claim 14, wherein a collimation lens is arranged between the laser emitter and the reflective grating and located on an incident path of the laser light, and the collimation lens is configured to collimate light rays emitted from the laser emitter into a collimated light beam and transmit the collimated light beam to the reflective grating; and/or
  an adjustment lens is arranged on a light output path of the laser pattern and configured to adjust optical performance of the output laser pattern.

* * * * *